Patented Aug. 29, 1950

2,520,139

UNITED STATES PATENT OFFICE 2,520,139

METHOD OF PREPARING ACYLATED HYDROXYPOLYCARBOXYLIC ACID ANHYDRIDES

Charles F. Fuchs, Chicago, Ill., assignor to The Emulsol Corporation, Chicago, Ill., a corporation of Illinois No Drawing. Application November 10, 1948, Serial No. 59,411

12 Claims. (Cl. 260—342.6)

1

My invention is directed to a new and useful method for the production of certain acyl hydroxypolycarboxylic acid anhydrides, namely, those wherein the acyl radical is at least one member selected from the group consisting of acetyl and propionyl radicals.

The preparation of such compounds, for example, diacetyl tartaric acid anhydride, has heretofore been known. This has commonly been done by admixing tartaric acid with an excess of acetic anhydride whereupon, on cooling, the reaction product, comprising mainly diacetyl tartaric acid anhydride, crystallizes from the mixture of acetic acid and excess acetic anhydride and is collected by filtration. Such procedures have a number of objections. The mother liquor, resulting from the formation of the crystalline diacetyl tartaric acid anhydride reaction product, is strongly acid and lachrymatory and its handling and separation are difficult. In addition, due to the solubility of the reaction product in the mother liquor, a lower yield of the desired reaction product results. Furthermore, since the mother liquor comprises a mixture of various products, recovery of the diacetyl tartaric acid anhydride therefrom is a difficult, costly and uneconomic procedure. Diacetyl tartaric acid anhydride, when prepared by such known methods, is frequently characterized by objectionable hygroscopicity and instability.

In accordance with my invention, the objections described above are overcome and the new and useful method which I describe in detail hereafter makes possible the production of acyl hydroxypolycarboxylic acid anhydrides in a simple manner and one adapted for large scale manufacture thereof. The compounds themselves are, moreover, readily recovered in excellent yields, in a high degree of purity and are characterized by substantial non-hygroscopicity and stability.

In general, my method comprises reacting an hydroxypolycarboxylic acid with an anhydride of at least one acid selected from the group consisting of acetic acid and propionic acid in amount not substantially less than the stoichiometric amount necessary to produce the acyl hydroxypolycarboxylic acid anhydride, heating the reaction mixture to distill off the excess acid, and recovering the acyl hydroxypolycarboxylic acid anhydride. It is particularly advantageous to utilize from about 3 to about 5 mols, preferably about 3.1 to 3.5 mols, of the acetic or propionic acid anhydride for each mol of di-hydroxy di-carboxylic acid, as, for example, tartaric acid, used in the reaction, and to carry out the reaction in the presence of a catalyst, such as an acidic material, and to recover the aforesaid acyl hydroxypolycarboxylic acid anhydride as a molten product. A suitable catalyst is sulfuric acid but it is preferable to use phosphoric acids, for example, concentrated (85%) phosphoric acid since products of lighter color are obtained. Where a mono-hydroxy di- or tri-carboxylic acid, as, for example, citric acid, is utilized, a minimum of 2 mols of the acetic or propionic acid anhydride is employed and preferably from about 2.1 to 3.5 mols is utilized. In general, the minimum molal quantity of acetic or propionic acid anhydride utilized for each mol of hydroxypolycarboxylic acid is equal to or not substantially less than the number of hydroxy groups to be esterified plus an additional mol for each two carboxylic groups to bring about anhydride formation. As a practical proposition, a slight excess over stoichiometric proportions is desirable.

The hydroxypolycarboxylic acid is preferably used in a dry or substantially dry form. If it contains a small amount of moisture, for example, of the order of about 1% or slightly more, the utilization in the reaction mixture of a proportionate excess amount of acetic or propionic acid anhydride will serve to eliminate such moisture.

The following examples are illustrative of particularly preferred embodiments of the practice of the method. It will be understood that said examples are, accordingly, not to be construed in any way as limitative of the full scope of the invention since various changes may be made, within the guiding principles disclosed herein, with respect to reactants, temperatures and times of reaction, the use of catalysts, if any, etc. All parts mentioned are by weight.

*Example 1*

1375 parts of dry tartaric acid are placed in an acid-resistant reaction vessel, and 2950 parts of acetic anhydride and 0.5 to 0.8 part of concentrated (85%) phosphoric acid are added. An exothermic reaction starts soon. After the maximum temperature has been reached, which is usually 210–230 degrees F., the reaction mixture is slowly heated up to about 240–250 degrees F., while stirring. The acetic acid formed in the reaction is distilled off, preferably by gradually applying a vacuum, which desirably should be about 26 to about 29 inches of mercury at the end of the distillation. About 2220 parts of practically pure glacial acetic acid are thereby recovered. By keeping the reaction mixture at a sufficiently high temperature, which is usually in the range of about 245–280 degrees F., practically all of the acetic acid is removed and the diacetyl tartaric acid anhydride remains as a molten product. The diacetyl tartaric acid anhydride product thus obtained may, if desired, be used in the same vessel as an intermediate for the production of other compounds. If this is not to be done, the molten diacetyl tartaric acid anhydride may be drained from the reaction vessel and allowed to stand whereupon, on cooling, it solidifies. The solid diacetyl tartaric acid anhydride is almost free of excess acetic acid and may be ground to a finely divided form if desired. The entire process can be finished in 3 hours or less, depending upon the quantities prepared and the design of the plant equipment employed.

*Example 2*

1500 parts of dry tartaric acid, 4000 parts of propionic acid anhydride, and 0.5 to 1 part of concentrated phosphoric acid are reacted in the manner described in Example 1. The dipropionyl tartaric acid anhydride is recovered substantially free of propionic acid.

*Example 3*

1900 parts of dry citric acid, 2500 parts of acetic anhydride, and 0.5 to 1 part of concentrated sulfuric acid are reacted in the manner described in Example 1. Acetyl citric acid anhydride is recovered in a form substantially free from any acetic acid.

While the invention is particularly advantageous for the production of acetyl and propionyl tartaric and citric acid anhydrides, it will be understood that the principles may also be used for the production of acetyl and propionyl derivatives of other hydroxypolycarboxylic acid anhydrides such as those of malic acid, glutaric acid, and the like.

While the invention has been described in detail, the scope thereof is not to be limited except as is set forth in the appended claims.

What I claim as new and desire to protect by Letters Patent of the United States is:

1. A method of preparing acyl hydroxypolycarboxylic acid anhydrides in which the acyl radical is at least one member selected from the group consisting of acetyl and propionyl radicals, which comprises reacting an hydroxypolycarboxylic acid with an anhydride of at least one acid selected from the group consisting of acetic acid and propionic acid in amount not substantially less than 1 mol of said anhydride for each alcoholic hydroxy group present in said hydroxypolycarboxylic acid plus an additional mol of said anhydride for each two carboxyl groups present in said hydroxypolycarboxylic acid, heating the reaction mixture to distill off excess acid, and recovering the acyl hydroxypolycarboxylic acid anhydride.

2. A method of preparing acyl hydroxypolycarboxylic acid anhydrides in which the acyl radical is at least one member selected from the group consisting of acetyl and propionyl radicals, which comprises reacting an hydroxypolycarboxylic acid with an anhydride of at least one acid selected from the group consisting of acetic acid and propionic acid in amount not substantially less than 1 mol of said anhydride for each alcoholic hydroxy group present in said hydroxypolycarboxylic acid plus an additional mol of said anhydride for each two carboxyl groups present in said hydroxypolycarboxylic acid, said reaction being carried out in the presence of a small amount of an acidic catalyst, heating the reaction mixture to distill off excess acid, and recovering the acyl hydroxypolycarboxylic acid anhydride.

3. A method of preparing acyl hydroxypolycarboxylic acid anhydrides in which the acyl radical is at least one member selected from the group consisting of acetyl and propionyl radicals, which comprises reacting an hydroxypolycarboxylic acid with an anhydride of at least one acid selected from the group consisting of acetic acid and propionic acid in amount not substantially less than 1 mol of said anhydride for each alcoholic hydroxy group present in said hydroxypolycarboxylic acid plus an additional mol of said anhydride for each two carboxyl groups present in said hydroxypolycarboxylic acid, heating the reaction mixture in vacuo to distill off excess acid, and recovering the acyl hydroxypolycarboxylic acid anhydride.

4. A method of preparing acyl hydroxypolycarboxylic acid anhydrides in which the acyl radical is at least one member selected from the group consisting of acetyl and propionyl radicals, which comprises reacting an hydroxypolycarboxylic acid with an anhydride of at least one acid selected from the group consisting of acetic acid and propionic acid in amount in excess of 1 mol of said anhydride for each alcoholic hydroxy group present in said hydroxypolycarboxylic acid plus an additional mol of said anhydride for each two carboxyl groups present in said hydroxypolycarboxylic acid, said reaction being carried out in the presence of a small amount of an acidic catalyst, heating the reaction mixture in vacuo to distill off excess acid, and recovering the acyl hydroxypolycarboxylic acid anhydride.

5. A method of preparing acyl hydroxypolycarboxylic acid anhydrides in which the acyl radical is at least one member selected from the group consisting of acetyl and propionyl radicals, which comprises reacting one mol of a dihydroxy dicarboxylic acid with from about 3 to about 5 mols of an anhydride of at least one acid selected from the group consisting of acetic acid and propionic acid, said reaction being carried out in the presence of a small amount of a phosphoric acid, gradually heating the reaction mixture, in vacuo, to distill off a major part of the excess organic acid, and recovering the acyl hydroxypolycarboxylic acid anhydride as a molten product.

6. A method of preparing acyl hydroxypolycarboxylic acid anhydrides in which the acyl radical is at least one member selected from the group consisting of acetyl and propionyl radicals, which comprises reacting an aliphatic hydroxypolycarboxylic acid having a total of up to 6 carbon atoms in its molecule with an anhydride of at least one acid selected from the group consisting of acetic acid and propionic acid in amount not substantially less than 1 mol of said anhydride for each alcoholic hydroxy group present in said hydroxypolycarboxylic acid plus an additional mol of said anhydride for each two carboxyl groups present in said hydroxypolycarboxylic acid, heating the reaction mixture, in vacuo, to distill off a major part of the excess acid, and recovering the acyl hydroxypolycarboxylic acid anhydride as a molten product.

7. A method of preparing diacetyl tartaric acid anhydride which comprises reacting tartaric acid with acetic acid anhydride in a molal ratio of 1 mol of tartaric acid to not substantially less than 3 mols of acetic acid anhydride, heating the reaction mixture to distill off excess acetic acid, and recovering the diacetyl tartaric acid anhydride.

8. A method of preparing diacetyl tartaric acid anhydride which comprises reacting tartaric acid with acetic acid anhydride in a molal ratio of 1 mol of tartaric acid to not substantially less than 3 mols of acetic acid anhydride, gradually heating the reaction mixture, in vacuo, to a temperature in the range of about 230 to about 280 degrees F. to distill off a major part of the excess acetic acid, and recovering the diacetyl tartaric acid anhydride as a molten product.

9. A method of preparing diacetyl tartaric acid anhydride which comprises reacting one mol of tartaric acid with from about 3 to about 5 mols of acetic acid anhydride, said reaction being carried out in the presence of a small amount of phosphoric acid, gradually heating the reaction mixture, in vacuo, to a temperature in the range of about 230 to about 280 degrees F. to distill off excess acetic acid, and recovering the diacetyl tartaric acid anhydride as a molten product.

10. A method of preparing acetyl citric acid anhydride which comprises reacting citric acid with acetic acid anhydride in a molal ratio of 1 mol of citric acid to not substantially less than 2 mols of acetic acid anhydride, heating the reaction mixture, in vacuo, to distill off excess acetic acid, and recovering the acetyl citric acid anhydride as a molten product.

11. A method of preparing diacetyl tartaric acid anhydride which comprises reacting 1 mol of tartaric acid with from about 3.1 to 3.5 mols of acetic acid anhydride, gradually heating the reaction mixture, in vacuo, to a temperature in the range of about 230 to about 280 degrees F. to distill off excess acetic acid, and recovering the diacetyl tartaric acid anhydride as a molten product.

12. A method of preparing diacetyl tartaric acid anhydride which comprises reacting 1 mol of tartaric acid with from about 3.1 to 3.5 mols of acetic acid anhydride, said reaction being carried out in the presence of a small amount of phosphoric acid, gradually heating the reaction mixture, in vacuo, to a temperature in the range of about 230 to about 280 degrees F. to distill off excess acetic acid, and recovering the diacetyl tartaric acid anhydride as a molten product.

CHARLES F. FUCHS.

REFERENCES CITED

The following references are of record in the file of this patent:

UNITED STATES PATENTS

| Number | Name | Date |
|---|---|---|
| 1,872,029 | Dreyfus | Aug. 16, 1932 |
| 2,258,947 | Crowell | Oct. 14, 1941 |

OTHER REFERENCES

Lucas et al., American Chemical Society Journal, v. 63, June 1941, page 1655.